United States Patent
Cornaglia et al.

(10) Patent No.: US 12,516,366 B2
(45) Date of Patent: *Jan. 6, 2026

(54) APPARATUS FOR MICROSCOPIC WORM OBSERVATION

(71) Applicant: NAGI BIOSCIENCE SA, St-Sulpice (CH)

(72) Inventors: Matteo Cornaglia, Lausanne (CH); Fabien Tache, Lausanne (CH)

(73) Assignee: NAGI BIOSCIENCE SA, St-Sulpice (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/683,730

(22) PCT Filed: Aug. 16, 2022

(86) PCT No.: PCT/EP2022/072867
§ 371 (c)(1),
(2) Date: Feb. 14, 2024

(87) PCT Pub. No.: WO2023/021038
PCT Pub. Date: Feb. 23, 2023

(65) Prior Publication Data
US 2024/0263213 A1 Aug. 8, 2024

(30) Foreign Application Priority Data
Aug. 17, 2021 (EP) ..................... 21191741

(51) Int. Cl.
*C12M 1/00* (2006.01)
*C12M 1/34* (2006.01)
(Continued)

(52) U.S. Cl.
CPC ............... *C12Q 1/18* (2013.01); *C12M 23/34* (2013.01); *C12M 29/06* (2013.01); *C12M 41/46* (2013.01); *C12M 41/48* (2013.01)

(58) Field of Classification Search
CPC ...... C12M 23/16; C12M 23/34; C12M 23/48; C12M 25/10; C12M 27/16; C12M 31/00;
(Continued)

(56) References Cited

U.S. PATENT DOCUMENTS

| | | | |
|---|---|---|---|
| 10,184,104 B2 | 1/2019 | Lianides et al. | |
| 2013/0224846 A1* | 8/2013 | Jovanovich | C12Q 1/6806 435/287.2 |

(Continued)

FOREIGN PATENT DOCUMENTS

| | | |
|---|---|---|
| CN | 105543085 A | 5/2016 |
| EP | 3209790 A1 | 4/2016 |

(Continued)

OTHER PUBLICATIONS

Trushal Vijaykumar Chokshi, et al., "An automated microfluidic platform for calcium imaging of chemosensory neurons in Caenorhabditis elegans", Lab on a Chip, vol. 10, No. 20, Jan. 1, 2010, pp. 2758-2763 (6 pages).

(Continued)

*Primary Examiner* — Liban M Hassan
(74) *Attorney, Agent, or Firm* — Nixon & Vanderhye PC (57) ABSTRACT

Microscopic worm culture and observation apparatus (1) comprising a support structure (10), one or more chip holders (3) mounted on the support structure, a pump (P) and a valve system (V), each chip holder configured for holding a microfluidic chip (2) having one or more microfluidic channels (54) and culture chambers (52) therein extending between a pump side coupling (44a) of the microfluidic chip and a reservoir side coupling (44b) of the microfluidic chip. The support structure comprises a reservoirs support platform (7) mounted on a movable table (12), the reservoirs support platform (7) configured for holding a plurality of nutrition reservoirs (5) for containing microscopic worms or (Continued)

nutrients and substances to be tested in a liquid. The chip holder (3) and/or microfluidic chips (2) comprise reservoir side fluidic couplings (26) in the form of hollow tubes extending from the microfluidic chip (2) to a tip (26b) at a free end of the hollow tube, each tip (26b) insertable in a corresponding nutrition reservoir (5). The support structure comprises an enclosure (15) forming a chamber within which the one or more chip holders and the reservoirs support platform is housed, and a temperature control unit (19) and a temperature sensor (23) for control of the temperature within the chamber, the enclosure comprising an openable or removable cover (17) allowing access to the inside of the enclosure.

13 Claims, 11 Drawing Sheets

(51) Int. Cl.
  *C12M 1/36* (2006.01)
  *C12Q 1/18* (2006.01)
(58) Field of Classification Search
  CPC ....... B01L 3/502723; B01L 2200/0684; G02B 21/0004; G06T 7/0012; G06T 2207/10056
  See application file for complete search history.

(56) References Cited

U.S. PATENT DOCUMENTS

2016/0312166 A1   10/2016   Lee
2017/0145373 A1   5/2017   Lianides et al.
2018/0016296 A1*  1/2018   Murphy ............... B01J 19/0093
2018/0128715 A1*  5/2018   Kim ....................... G01N 21/13

FOREIGN PATENT DOCUMENTS

| JP | 2012-529268 A | 11/2012 |
| JP | 2015-500020 A | 1/2015 |
| WO | 2016/063199 A1 | 4/2016 |
| WO | 2017/027838 A1 | 2/2017 |

OTHER PUBLICATIONS

Jingjing Wang, et al., "Microfluidic worm-chip for in vivo analysis of neuronal activity upon dynamic chemical stimulations", Analytica Chimica Acta, vol. 701, No. 1, accepted Jun. 5, 2011, pp. 23-28 (6 pages).
International Preliminary Report on Patentability for PCT/EP2022/072867 completed Jul. 25, 2023, 12 pages.
International Search Report and Written Opinion of the ISA for PCT/EP2022/072867 mailed Dec. 1, 2022, 14 pages.
Office Action dated Sep. 10, 2024, issued in Japan Patent Application No. 2024-510267, 3 pages.
Cornaglia, Matteo, et al., "An automated microfluidic platform for C. elegans embryo arraying, phenotyping, and long-term live imaging", Scientific Reports, vol. 5, May 7, 2015, Article No. 10192, 13 pages.
U.S. Appl. No. 18/683,715, filed Feb. 14, 2024.

* cited by examiner

APPARATUS FOR MICROSCOPIC WORM OBSERVATION

CROSS-REFERENCE TO RELATED APPLICATIONS

This application is the U.S. national phase of International Application No. PCT/EP2022/072867 filed Aug. 16, 2022 which designated the U.S. and claims priority to EP Patent Application No. 21/191,741.4 filed Aug. 17, 2021, the entire contents of each of which are hereby incorporated by reference.

FIELD OF THE INVENTION

The present invention relates to an apparatus for observing the effects of substances, such as drugs, potentially harmful substances and potentially beneficial substances on microscopic worms, for instance the microscopic roundworm C. elegans.

BACKGROUND OF THE INVENTION

It is known to observe the growth and behavior of the microscopic roundworm C. elegans for determining the toxicity of a substance, for instance for testing of pharmaceutical drugs, testing of pollutants in water, and various other applications. It is known to use a microfluidic chip, for instance as described in EP3209790, in which microscopic worms are injected into chambers of the microfluidic chip. A medium containing nutrients and the substances to be tested may be injected at specified concentrations and different times. The growth and activity of the worms in the microfluidic chambers may be observed with a microscope, the microfluidic chamber being made of a transparent material. A plurality of channels, each comprising a plurality of successive chambers is provided, each channel being supplied with similar or separate substances in order to compare the growth and behavior of the worms in different chambers. The observation of the growth and activity of the worms may occur typically in a period of one to three weeks during which time worms are fed with nutrients, typically a solution containing bacteria, for the growth of the worms.

In conventional systems, the loading of microfluidic chips with worms, in the initial phase, and the subsequent feeding of the worms is a complex and laborious process. Moreover, observation of the behavior and growth of the worms is performed typically in a laboratory setting with many manual operations that are costly and also reduce the reliability of the monitoring and the conclusions drawn therefrom.

The observation of other types of worms may also benefit from less laborious and complex observation and handling procedures.

SUMMARY OF THE INVENTION

In view of the foregoing, it is an object of the invention to provide a system for more accurate and repeatable monitoring of microscopic worm growth or other and their behavior in an economical and reliable manner.

It is advantageous to provide an apparatus for monitoring the growth, behavior and other phenotypes of microscopic worms for the testing of various substances that is easy to set up and easy to operate in an automated procedure.

It is advantageous to provide a microfluidic system for the culture and observation of microscopic worms that allows easy and reliable observation of the worms in parallel in a large number of chambers without the problems of bubbles and other inconsistencies in the microfluidic networks.

Objects of this invention have been achieved by providing an apparatus according to claim 1.

Objects of this invention have been achieved by providing a method according to claim 11.

Disclosed herein is a microscopic worm culture and observation apparatus comprising a support structure, one or more chip holders mounted on the support structure, a pump and a valve system, each chip holder configured for holding a microfluidic chip having one or more microfluidic channels and culture chambers herein extending between a pump side coupling of the microfluidic chip and a reservoir side coupling of the microfluidic chip. The support structure comprises a reservoirs support platform mounted on a movable table, the reservoirs support platform configured for holding a plurality of nutrition reservoirs for containing microscopic worms or nutrients and substances to be tested in a liquid. The chip holder and/or microfluidic chips comprise reservoir side fluidic couplings in the form of hollow tubes extending from the microfluidic chip to a tip at a free end of the hollow tube, each tip insertable in a corresponding nutrition reservoir.

According to a first aspect of the invention, the support structure comprises an enclosure forming a chamber within which the one or more chip holders and the reservoirs support platform is housed, and a temperature control unit and a temperature sensor for control of the temperature within the chamber, the enclosure comprising an openable or removable cover allowing access to the inside of the enclosure.

According to a second aspect of the invention, the movable table is coupled to a height actuator mechanism and an oscillating mechanism configured to oscillate the reservoir support platform in a horizontal plane by an amplitude less than a diameter of the nutrient reservoir, and actuate a vertical movement of the reservoirs support platform with the height actuator mechanism.

In an advantageous embodiment, there are a plurality of said chip holders arranged substantially in parallel on the support structure.

In an advantageous embodiment, each microfluidic chip comprises a plurality of parallel microfluidic channels, each microfluidic channel passing fluidically through a plurality of successive culture chambers.

In an advantageous embodiment, each microfluidic channel comprises a pump side coupling orifice and a reservoir side coupling orifice, the orifices configured for insertably receiving in a sealing manner ends of hollow tubes.

In an advantageous embodiment, the microfluidic chips are fluidically coupled to corresponding fluidic tubes connectors pluggably coupled to the chip holder and sealingly lodging ends of fluidic tubes that extends to the pump and/or valve system.

In an advantageous embodiment, the apparatus further comprises a tube tip sealing plate comprising a support frame and an elastomer pad movable under the tips of the hollow tubes and configured for sealingly pressing said elastomer pads against said tips during a corresponding operation step of the apparatus.

In an advantageous embodiment, said corresponding operation step comprises a debubbling operation of the fluidic channels within the microfluidic chip.

In an advantageous embodiment, reservoir side coupling orifices of the microfluidic chip and corresponding hollow tubes are arranged in a spaced out manner in both X and Y orthogonal directions of a horizontal plane, such that the hollow tubes are spaced out according to a two-dimensional grid, the hollow tubes being arranged at intersections of a substantially square or rectangular grid.

In an advantageous embodiment, the pump side fluidic coupling comprises a plurality of hollow tubes coupled to the chip holder and inserted into corresponding pump side coupling orifices of the microfluidic chip.

In an advantageous embodiment, the chip holder comprises a base and a cover pivotally coupled to the base, movable from an open position in which the microfluidic chip may be lodged on the base, and movable to a closed position held by a closing mechanism clamping the microfluidic chip within the chip holder.

In an advantageous embodiment, the chip holder comprises a viewing window in both a base and cover to allow light to shine through from a bottom side of the microfluidic chip to a top side viewable by a microscope.

In an advantageous embodiment, an imaging system comprising a microscope, a lighting system, and a computing system connected to the valve system and pump, actuation mechanism, lighting system and imaging system, is configured for automatic operation of microscopic worms in the culture chambers of the microfluidic chip and imaging the microscopic worms in said culture chambers over a period of time ranging between a few days to a few weeks.

Also disclosed herein is a method of operating a microscopic worm culture and observation apparatus as set forth above, comprising a worm feeding operation including operating the pump (P) in a feeding direction to draw liquid from the nutrient reservoirs into the culture chambers of the microfluidic chips, adjusting the height of the reservoirs support platform, and stirring the liquid in the nutrient reservoirs by actuation of an oscillating movement, either simultaneously during the operation of the pump or immediately prior to operation of the pump.

In an advantageous embodiment, operation of the apparatus comprises a chip priming step after loading of a new microfluidic chip in the apparatus, the chip priming step comprising operating the pump in a direction of fluid flow exiting the hollow tubes (a priming direction) to pump a priming liquid through the microfluidic channels and culture chambers of the microfluidic chips until said priming liquid exits tips of the hollow tubes.

In an advantageous embodiment, operation of the apparatus includes a chip debubbling operation, said debubbling operation including pumping a liquid in a priming direction while pressing an elastomer pad against said tips to sealingly close them and generate an overpressure within the microfluidic channels.

In an advantageous embodiment, operation of the apparatus comprises a worm loading on chip operation including positioning nutrient reservoirs containing microscopic worms to be injected in culture chambers of the microfluidic chips under the tips of the hollow tubes and inserting the tips into the liquid, operating the pump with pulses to inject microscopic worms into the culture chambers.

In an advantageous embodiment, operation of the apparatus includes a reservoir exchange step including removing the tips of the hollow tubes out of a first set of reservoirs, operating the pump in a priming direction to create droplets at the tips, and subsequently moving the reservoir support platform to insert the tips of the hollow tubes into a new set of nutrient reservoirs.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which:

FIG. 5b is a top view of the device of FIG. 5a;

FIG. 8 is a perspective view of a reservoirs support platform of the apparatus of FIG. 3 according to an embodiment of the invention;

FIG. 8a is a perspective view of a portion of the support platform of FIG. 8 and a chip holder mounted thereon;

FIG. 8b is a cross-sectional view through line 8b-8b of FIG. 8a.

DETAILED DESCRIPTION OF EMBODIMENTS OF THE INVENTION

Referring to the figures, a microscopic worm culture and observation apparatus 1 according to embodiments of the invention comprises a support structure 10 comprising a microfluidic cartridge support platform 6 on which one or more chip holders 3 are mounted, each chip holder 3 configured for mounting of a microfluidic chip 2, and an enclosure 15 within which the microfluidic cartridge support platform 6 is housed. The enclosure comprises an openable or removable cover 17 allowing access to the inside of the enclosure. The microscopic worm culture and observation apparatus 1 further comprises a pump P and a valve system V coupled to fluidic tubes 36 that fluidically interconnect the microfluidic chip 2 to reagent and waste containers 34.

The microscopic worm culture and observation apparatus further comprises a plurality of nutrition reservoirs 5 for supplying microscopic worms into the microfluidic chip in an initial phase, and subsequently for supplying nutrients and substances to be tested to the microscopic worms contained in chambers 52 of the microfluidic chip 2.

The support structure 10 further comprises a reservoir support platform 7 on which the plurality of nutrition reservoirs 5 are positioned and secured. The microfluidic chip 2 fluidically couples to liquid in the nutrition reservoirs 5 via a reservoir-side fluidic coupling 26 extending from a base 18 of the chip holder 3. The reservoir-side fluidic coupling 26 connects to microfluidic channels within the microfluidic chip on one end, named herein a chip coupling section 26a, and extends to an opposite end forming a tip 26b that may be immersed in liquid within the nutrition reservoirs. The reservoir-side fluidic coupling 26 is preferably in the form of a hollow tube, preferably a rigid tube, in particular a straight tube similar to a long needle. The hollow tube may for instance be formed of a metallic tube for a high stiffness yet small diameter and wall thickness. The hollow tube may however be made of a plastics material and be semi-rigid, the main aspect being that it is has the required structural properties to ensure that the tip is positioned to enter the corresponding reservoir.

Figures 8, 8A, 8B:
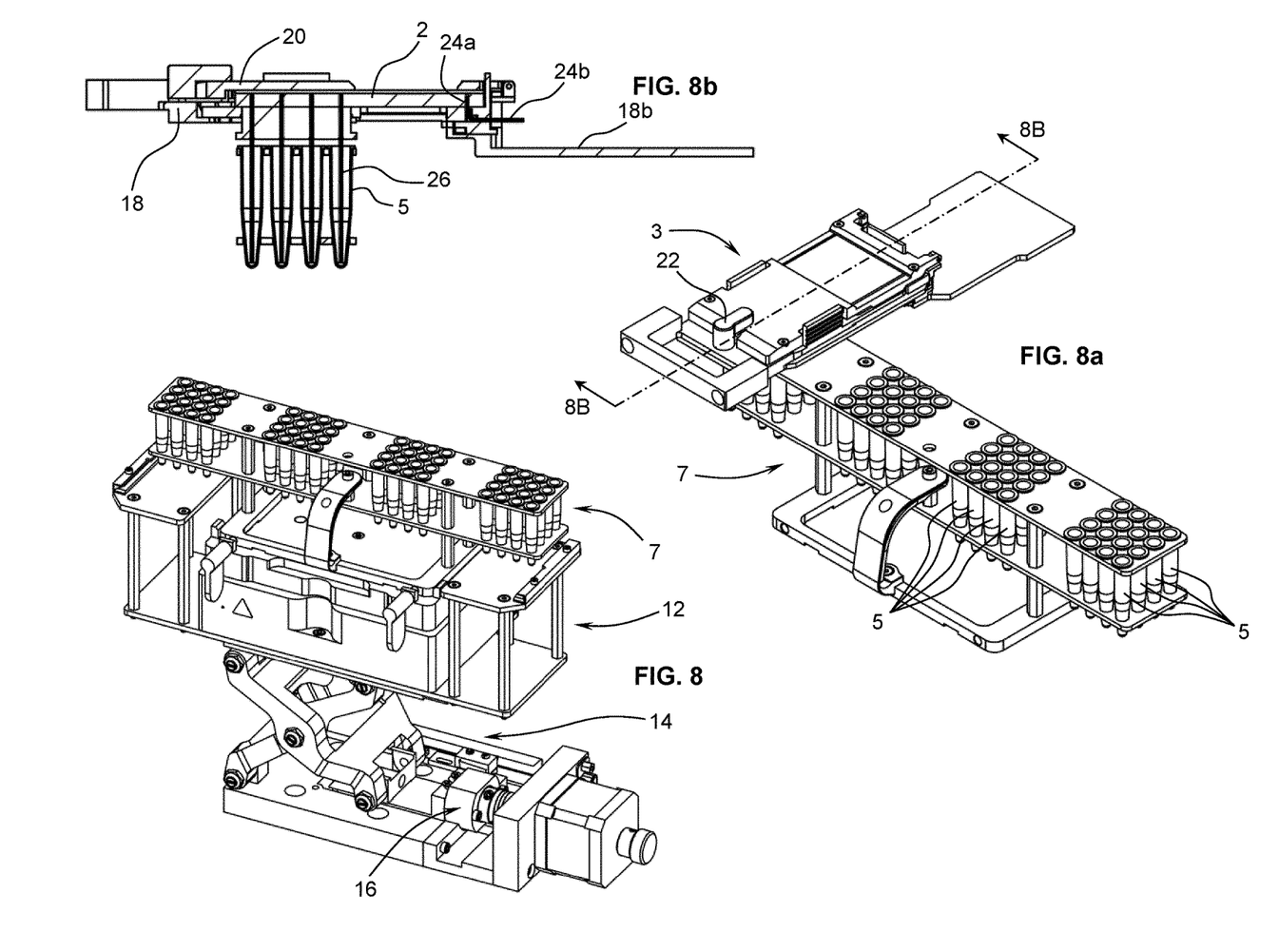

The reservoirs support platform 7 is mounted on a movable table 12 coupled to a height actuator mechanism 14 for adjusting the height of the reservoirs relative to the chip holder 3. The height actuator mechanism 14 comprises at least one actuator 16. The height actuator mechanism has a vertical travel greater than the height H of the nutrition reservoirs 5 that is sufficient to completely descend the reservoirs support platform 7 such that the hollow tubes 26 are completely removed and disengaged from the nutrition reservoirs 5. The height actuator mechanism 14 allows the hollow tubes to be inserted into the nutrition reservoirs 5 such that the tube tip 26b extends to a bottom or close to a bottom of the nutrition reservoirs, on the one hand, and on the other hand to lift the tube tip 26b completely out of the nutrition reservoirs 5.

The reservoirs support platform 7 comprises a further actuation mechanism configured to vibrate the movable table 12 or a part thereof holding the reservoirs, relative to the chip holder in a horizontal plane with an amplitude that is less than the diameter D of the nutrition reservoirs. The movement may be a substantially circular movement, an elliptical movement, a linear oscillating movement, or any movement between a linear and a circular movement such that when the rigid tubes 26 are inserted in the reservoirs and the oscillation movement is applied, a mixing of the liquid within the reservoirs is effected.

The horizontal oscillation movement of the reservoirs support platform may be actuated concurrently or non-concurrently with a height actuation such that mixing may be performed both with the rigid tubes in a constant height position or in a varying height during the oscillation.

The height actuator mechanism 14 is shown comprising a pair of scissor type linkage arms and a piston 16 actuating one of the pair of the linkage arms, however various other height adjustment mechanisms, for instance based on a linear motor with a screw and nut mechanism, or a hydraulic or pneumatic actuation mechanism may be used without departing from the scope of the invention.

The oscillating movement in a horizontal plane of the reservoirs support platform may also be performed by various per se known mechanisms, for instance a rotary motor with an excentre coupled to the movable table 12.

Advantageously, a combination of the height adjustment and horizontal oscillation allows to perform a very effective mixing of the liquid within the nutrient reservoirs ensuring that any nutrients and other particles and substances are evenly distributed within the liquid during which time the pump P may be actuated to draw liquid and nutrients and other substances from the nutrient reservoirs into the microfluidic chips 2. Nutrients and other particles and substances falling and collecting at the bottom of the nutrient reservoirs 5 or floating on the top of the liquid in the nutrient reservoirs are thus evenly mixed prior to sucking the liquid into the microfluidic chambers 52 in the microfluidic chip 2. Mixing may also be performed outside of the sucking of liquids into the microfluidic chamber in order to ensure homogeneous properties of the liquid within the nutrient reservoirs, which may be important depending on the liquids and substances contained within the reservoirs.

The enclosure 15 allows to provide a controlled environment within the enclosure, in particular for control of the temperature, and possible also the humidity, within the chamber enclosed by the enclosure and within which the reservoirs and microfluidic chips are positioned. The worm culture and observation apparatus 1 may further comprise temperature a control unit 19, for instance a heating unit and optionally in addition a cooling unit, and a temperature sensor 23 for measuring the temperature inside the enclosure.

The worm culture and observation apparatus may further comprise a computing system 46 connected to one or more actuation mechanisms of the movable table 12, to the valve system V and to the pump P in order to control and coordinate actions of the pump, valve system and movable table actuation mechanisms during operation of the apparatus. The computing system is further connected to the temperature sensors.

The worm culture and observation apparatus 1 further comprises an imaging system 42 which may in particular comprise a microscope 44 and a camera system for capturing still or moving images of microscopic worms within the chambers 52 of the microfluidic chips 2. The imaging system 42 is connected to the computing system 46 that records the captured still or moving images, the computing system comprising software stored therein for processing and analysing the images.

Figure 4:
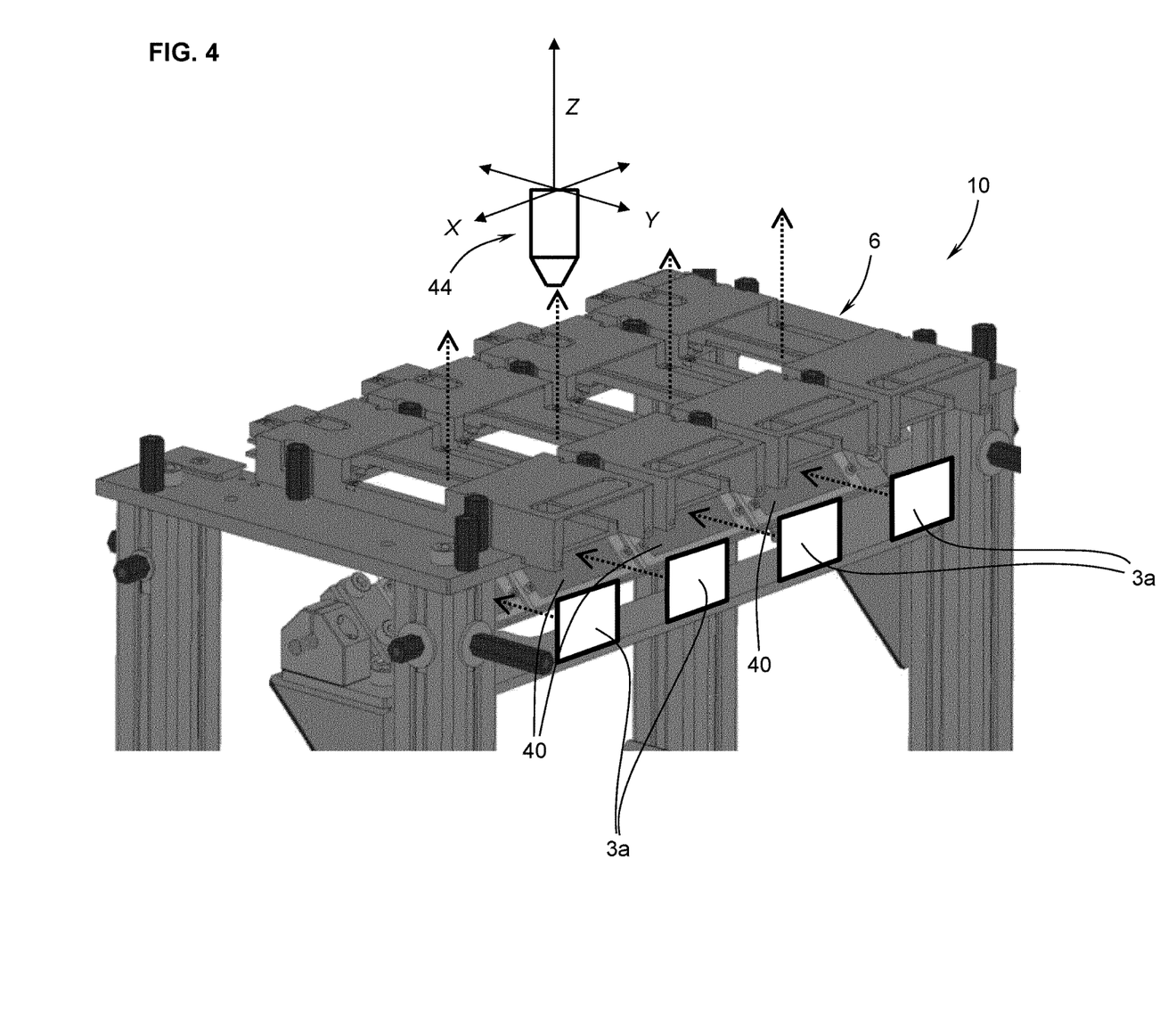
FIG. 4 is a view of a portion of the apparatus of FIG. 3 showing schematically a lighting system and microscope for observation of microfluidic chips.

The microscope 44 is mounted on an actuation mechanism (not shown) configured to displace the microscope in the horizontal plane X-Y in order to position the microscope over each of the microfluidic chips 2, in particular the section containing the culture chambers 52. The microscope may also be adjustable in its height Z and of course comprises a focus mechanism in order to adjust the focal plane of the microscope at the level within each culture chamber 52. The imaging system 42 further comprises a lighting system 38 generating light below the microfluidic chips, shining through the transparent material of the microfluidic chips in order to improve the image quality of the worms within the chambers 52.

The lighting system may advantageously comprise light sources 3a such as LED light panels mounted on the support structure 10 shining light substantially horizontally and that is reflected off mirrors 40 positioned below each of the plurality of chip holders 3. The direction of projection of light from the LED panels may thus be parallel to the plane X-Y of the microfluidic chips and in a deported position. This advantageously provides for a particularly compact lighting arrangement in an easy to configure and maintain arrangement.

The chip holder 3 is provided with a window 21 in the base 18 and in the cover 20 to allow the light to pass through the portion of the microfluidic chip 2 comprising the culture chambers 52 for visualization through the microscope 44. Since the light sources 3a may be positioned along an outer edge of the support structure 10, in view of the mirror system 40, these light sources, in particular LED panels may be easily replaced or changed and in addition various filters may be inserted between the light source and the mirrors depending on the type of light required for the observation. For instance, lighting of certain colours, fluorescent lighting, or other types of lighting allowing to observe certain substances or to better distinguish certain substances from other substances and from the worms may be desired. For instance, fluorescent markers expressed or ingested by the worms may be detected.

The mirror system 40 may be based on mirrors with reflective surfaces or by prisms with an internally reflective surface due to refractive index and an angle incidence of the light.

Figure 5:
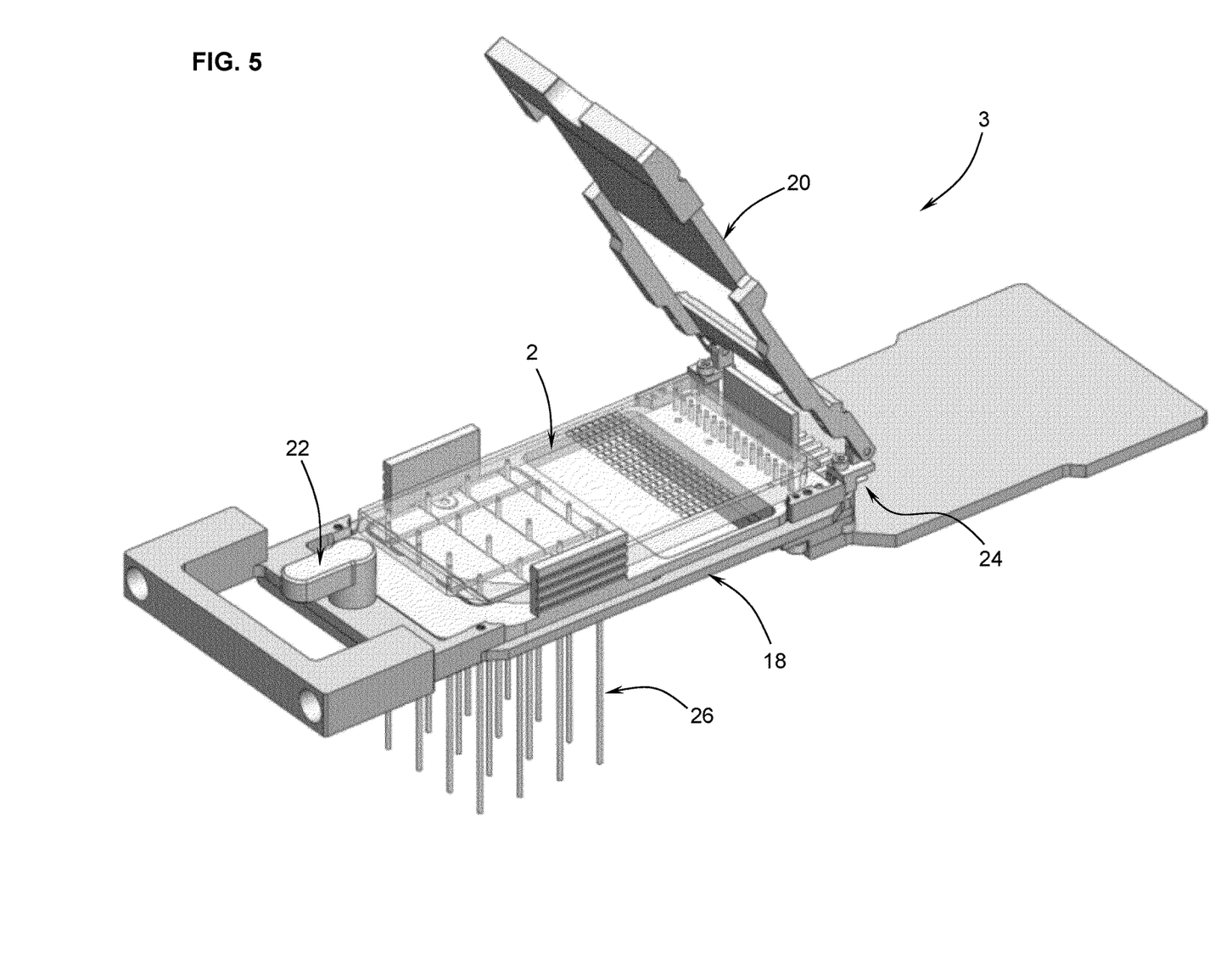
FIG. 5 is a perspective view of a microfluidic chip in a microfluidic chip holder of an apparatus according to an embodiment of the invention, showing a cover of the chip holder in an open position.
Figures 5A, 5C:
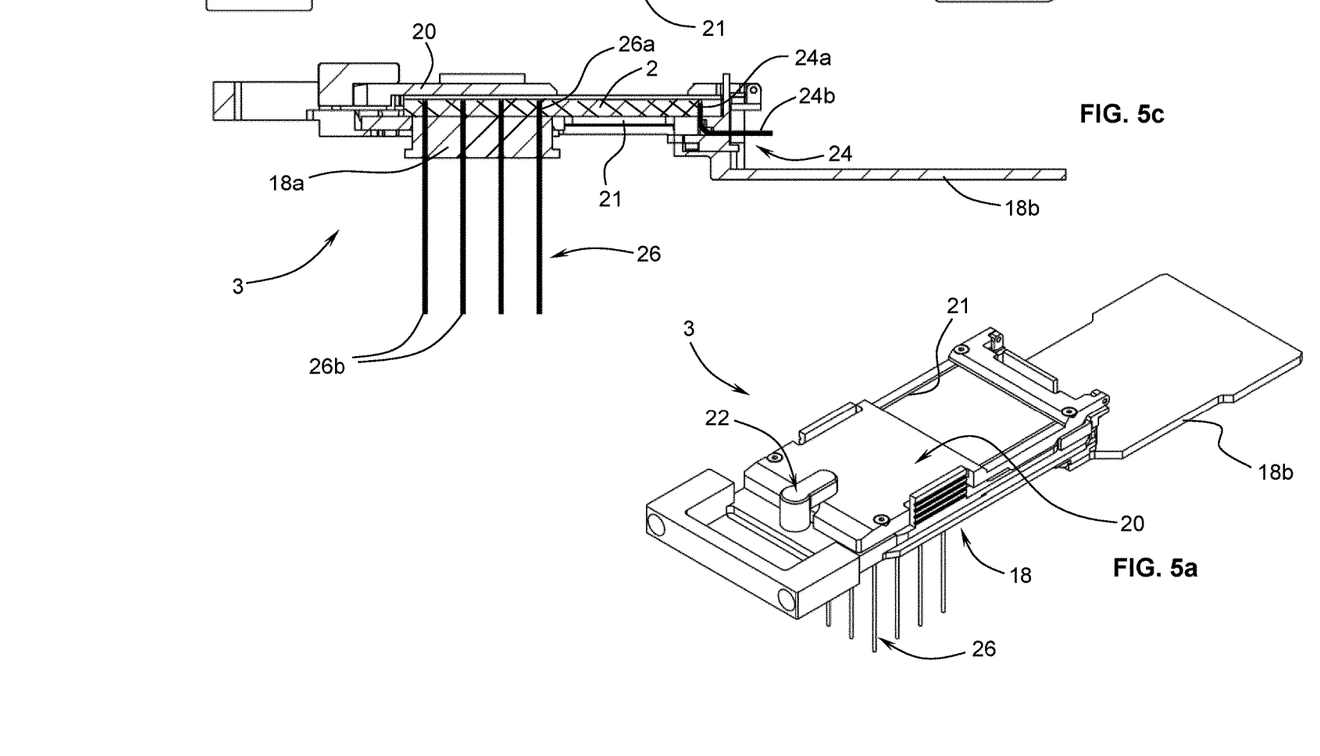
FIG. 5a is a view similar to FIG. 5 with the cover in the closed position.
FIG. 5c is a cross-sectional view through line 5c-5c of FIG. 5b.
Figure 5B:
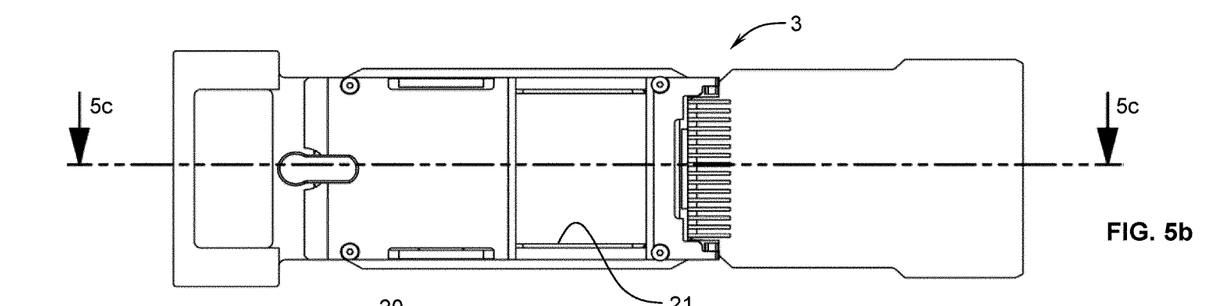

Referring in particular to FIGS. 5 to 5e and 6 to 6b, a chip holder 3 according to embodiments of the invention comprises a base 18 and a cover 20. The chip holder cover 20 may for instance be hingeably coupled to the base 18 and pivotable from an open position as illustrated in FIG. 5 to a closed position as illustrated in FIGS. 5a to 5c. In the open position, the microfluidic chip 2 may be positioned on the base 18 and the cover closed down thereagainst and locked with a closing mechanism 22, for instance in the form of a rotatable latch. Other clamping and closing mechanisms may be provided without departing from the scope of the invention, for instance by means of a cantilever elastic beam with a latching shoulder, a bridging element that pivots and spans over the end of the cover, a screw or bolt mechanism and various other per se well known closing and clamping mechanisms.

Figures 5D, 5E:
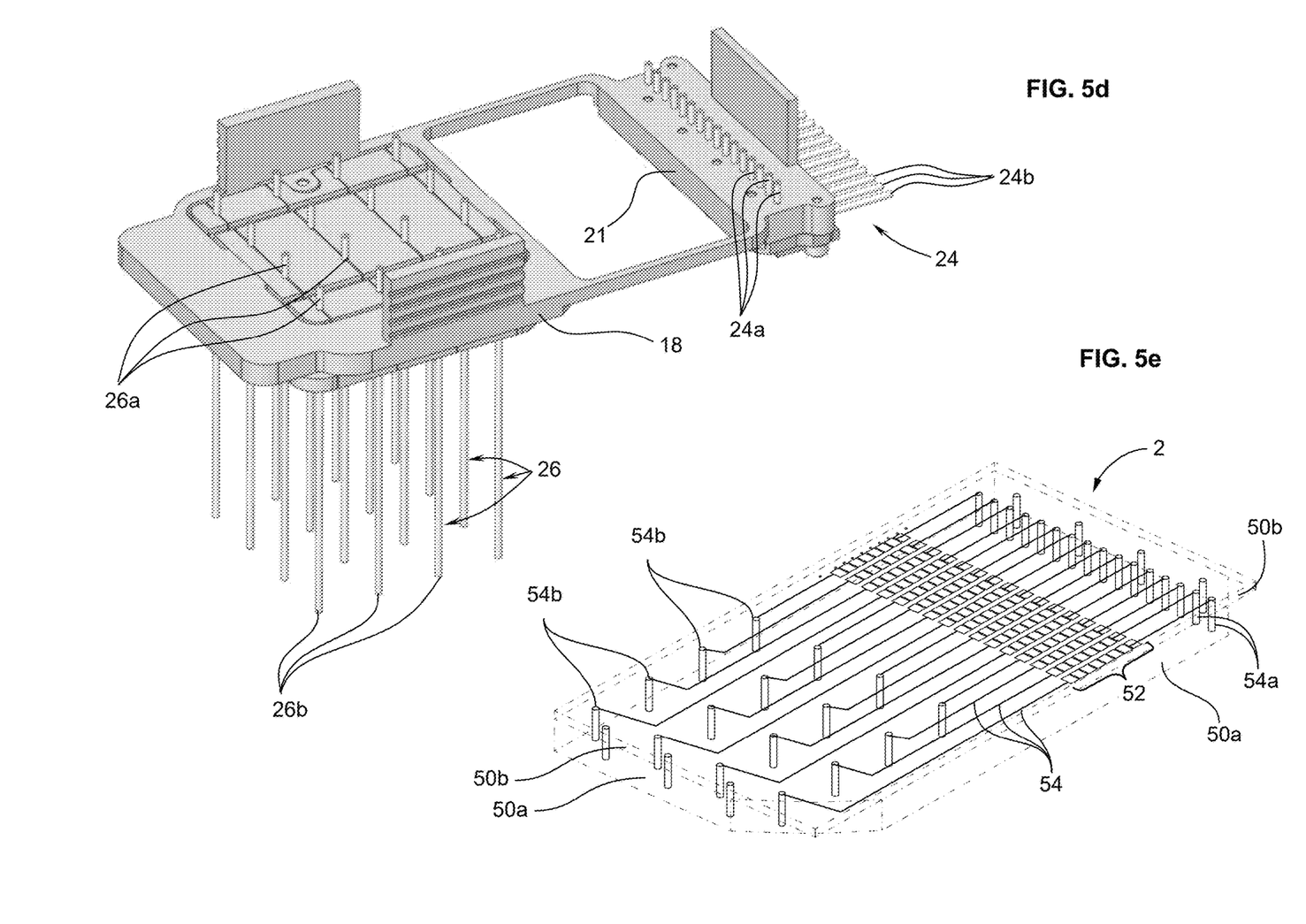
FIG. 5d is a perspective view of a portion of the microfluidic chip holder of FIG. 5 without the microfluidic chip and with a cover removed.
FIG. 5e is a perspective view of a microfluidic chip for mounting in the microfluidic chip holder of FIG. 5.

The reservoir side fluidic couplings 26 in a form of hollow tubes may be secured to the base 18 and present chip coupling sections 28a projecting above the base 18 for insertion in complementary reservoir side coupling orifices 54b extending into the base 50a of the microfluidic chip 2. The chip coupling sections 26a of the hollow tubes 26b insert into the corresponding cavities 54b with a tight fit in order to provide a hermetic sealing between the tubes and orifice walls. In embodiments, the chip coupling section 26a of the tubes may be provided with a sealing ring or sealing coating around the tube for providing a seal between the orifice walls and tube. Other materials, such as an adhesive or bonding material, may also be provided. The chip coupling section 26a of the hollow tubes 26 may also be welded to the chip, for instance by ultrasonic welding. In a first variant, the reservoir side fluidic couplings 26 in the form of hollow tubes may be pre-mounted to the microfluidic chip 2 and permanently welded, bonded or attached thereto and disposed of with the microfluidic chip. In another embodiment, the reservoir side fluidic couplings 26 in the form of hollow tubes may be fixed permanently to the microfluidic chip holder 3 and reusable for a plurality of operations with different microfluidic chips.

In yet a further embodiment, the microfluidic chip holder 3 may be a component that is also single use and disposed off after the end of the operations with the microfluidic chip.

Figure 6:
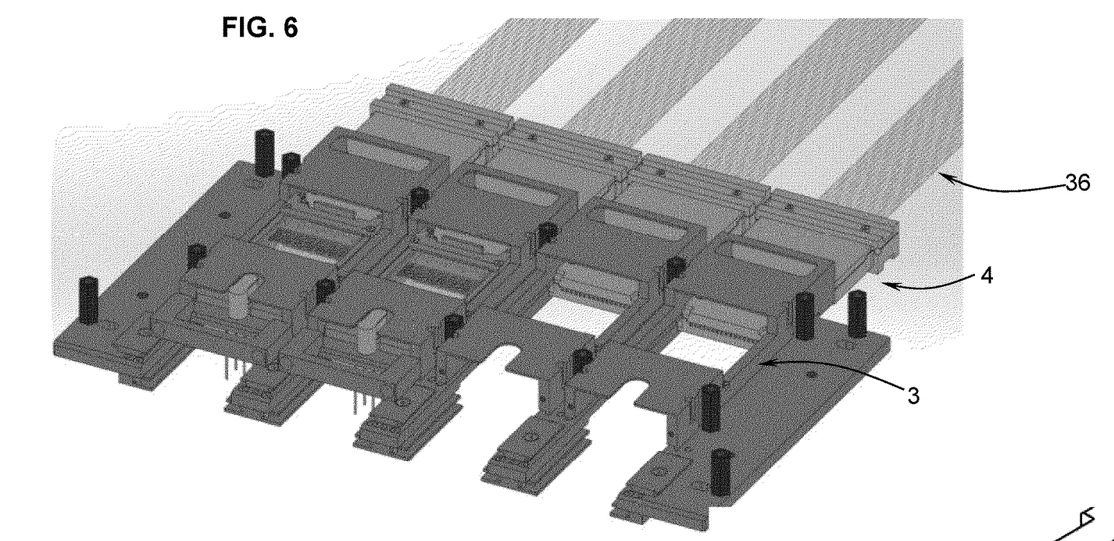
FIG. 6 is a perspective view of a plurality of microfluidic chip holders in a support structure 10 of the apparatus according to an embodiment of the invention, further illustrating fluidic tubes connectors 4 coupled to the chip holders, for supplying liquid to the microfluidic chips.
Figure 6A:
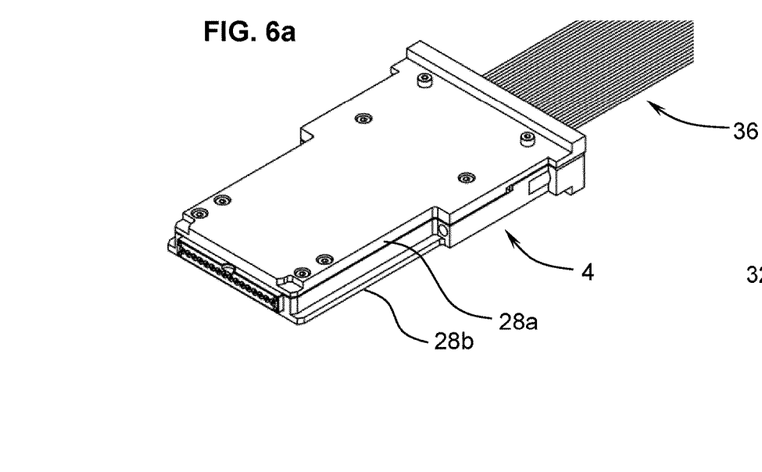
FIG. 6a is a perspective view of a fluidic tubes connector of FIG. 6.

The chip holder 3 further comprises a pump side fluidic coupling 24 for fluidically interconnecting the microfluidic chip 2 to fluidic tubes 36 connected to the valve system V, pump P and reagent and waste containers 34. The pump side fluidic coupling 24 may advantageously comprise hollow tubes having a chip coupling section 24a at one end that insert into pump side coupling orifices 54a of the microfluidic chip, and extending at the other end to a connector coupling section 24b for insertion into a plug coupling portion 32 of a fluidic tubes connector 4. The pump side fluidic coupling 24 may for instance comprise an elbow or L-shaped hollow metallic tube embedded in the base 18 of the chip holder 3 or may comprise two separate sections of tubes, one forming the chip coupling section 24a and the other forming the connector coupling section 24b interconnected fluidically by a channel formed within the base 18. Other couplings may also be used, for instance the tubes 24b may be removed and the connection ensured by flexible sealing rings or a gasket at the interface of the connector coupling section.

As discussed above in relation to the reservoir side fluidic couplings 26, the pump side fluidic couplings 24 may comprise an external sealing element or may be welded to the microfluidic chip or coupled by various other means in a hermetically sealed manner.

Within the microfluidic chip, microfluidic channels 54 fluidically interconnect the pump side coupling orifice 54a to the reservoir side coupling orifice 54b extending through a plurality of successively arranged microfluidic culture chambers 52. In the embodiment shown, there are sixteen substantially parallel microfluidic channels 54, each channel passing through eight successively arranged culture chambers 52 such there are in total a hundred and twenty eight microfluidic chambers that may be observed with a single microfluidic chip.

The reservoir side coupling orifices 54b of the microfluidic chip and corresponding hollow tubes 26 may advantageously be arranged in a spaced out manner in both X and Y orthogonal directions of a horizontal plane, such that the hollow tubes are spaced out according to a two-dimensional grid, the hollow tubes for instance being arranged at intersections of a substantially square or rectangular grid as best illustrated in FIG. 5e.

The microfluidic channels 54 may contain worms of the same type and of similar age, fed with substantially identical nutrients. This may allow the observation of worms in a plurality of microfluidic chambers for a statistical evaluation of their behavior, growth and other phenotypes. This may be multiplied further by having similar conditions for each of the plurality of microfluidic chips 2 contained in the worm culture and observation apparatus 1. However, the conditions regarding the age of the worms, the types of nutrients, the substances injected, and the reagents used may be varied on a chip-to chip basis or on a channel-to-channel basis within a chip 2, or with certain sets of channels, and so on. For instance, there may be one or some of the plurality of channels 54 of a chip having microscopic worms without substances to be tested, for control and comparison purposes. There may also be the same substance being fed into different channels 54 or microfluidic chips 2, but at different concentrations. It may be noted that co-cultures of two or more different biological models are also possible in each channel, e.g. different cell types or different types of worms and/or bacteria etc. in the same channel.

Figure 6B:
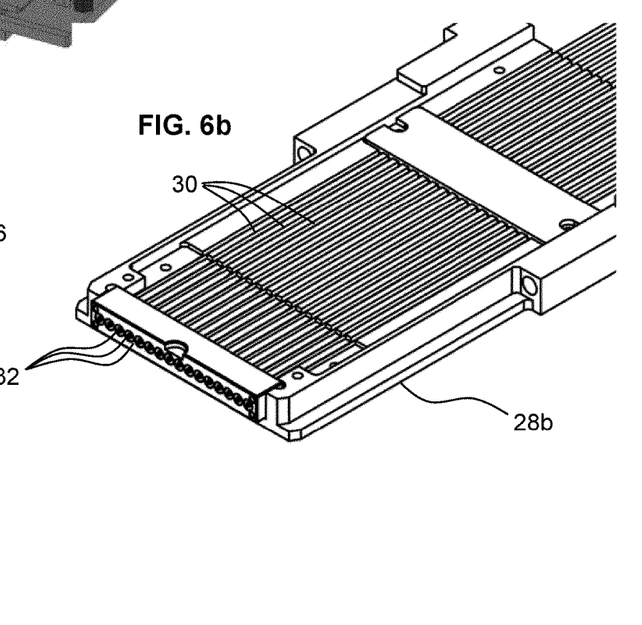
FIG. 6b is a perspective view of a base-portion of the fluidic tubes connector of FIG. 6a with a cover portion removed and with the fluidic tubes for supplying liquid removed.

The microfluidic chip 2 and chip holder 3 may be conveniently interconnected to the valve and pump system V, P, and the reagent and waste containers 34 with the fluidic tubes connector 4, The fluidic tubes connector 4 comprises a plug coupling portion 32 with orifices for hermetic coupling to the chip coupling sections 24a of the chip holder 3 and microfluidic chip 2. In an advantageous embodiment, the fluidic tubes connector 4 may comprise a bottom part 28b comprising a plurality of grooves 30 to receive fluidic tubes 36 therein, and a top part 28a that covers the bottom part and clamps the ends of the fluidic tubes 36 therein. The top part and bottom part may be made of various materials and the clamping together may be made in a removable or permanent manner, for instance by screws or by bounding or welding. The fluidic tubes 36 are preferably in the form of, or at least comprises a portion of, supple polymer tubes that may be squeezed in a peristaltic type or shuttle type of pump. The fluidic tubes 36 may thus extend from the fluidic tubes connector 4 all the way to the valve system V.

The pump P may be in the form of a peristatic pump or a shuttle type pump engaging fluidic tubes extending between reagent containers 34 and the valve system V. Within the scope of the invention, the configuration of the pump P and valve V may take various forms, for instance the pump may be positioned between the valve system V and the microfluidic chip 2, or a separate independently controlled pump may be provided between the valve system and chips. Instead of a peristaltic pump system, a syringe pump system or a membrane type pump system may be provided. Such pump systems are per se known and do not need to be further described, as are valve systems.

Figure 7:
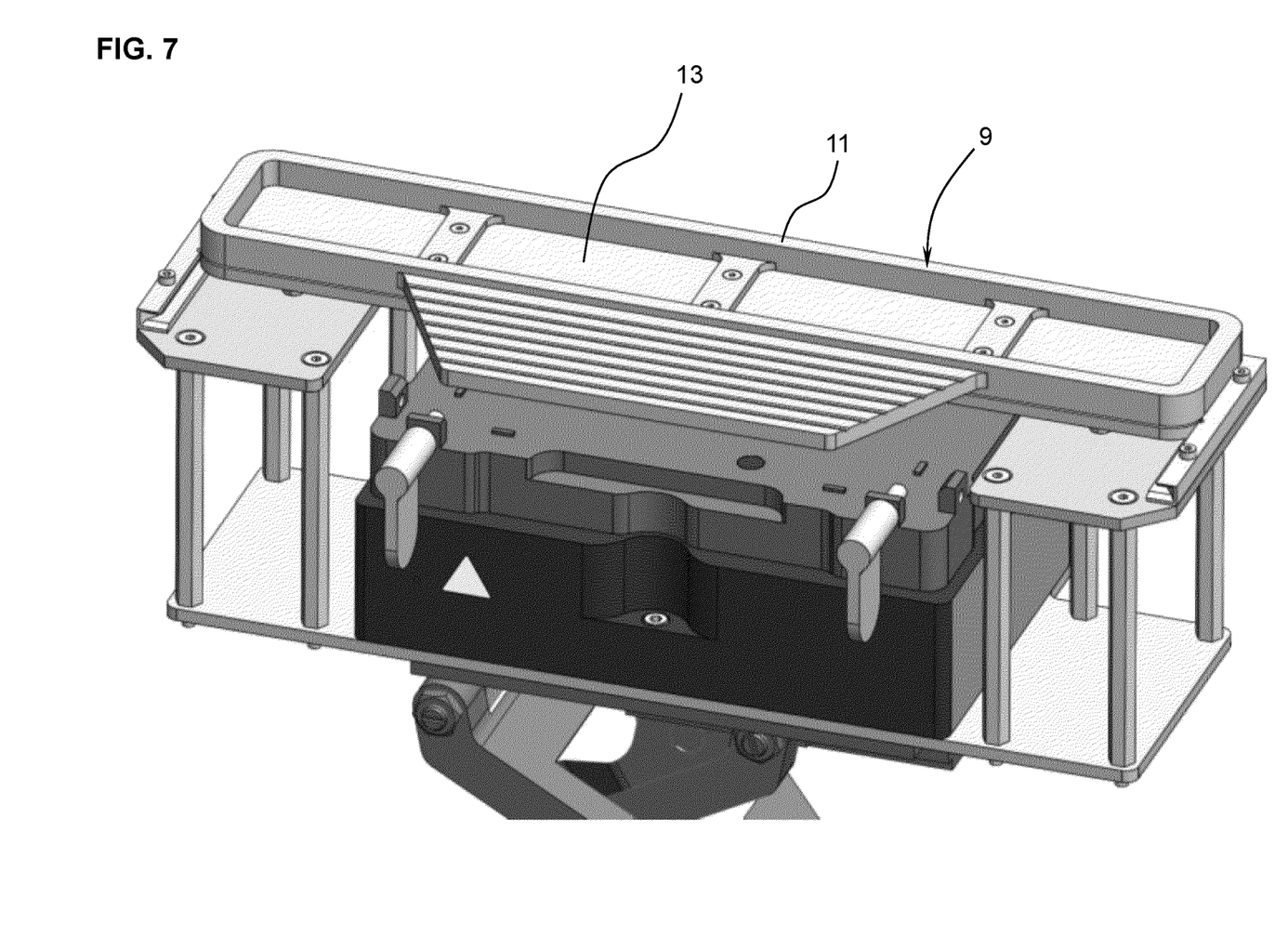
FIG. 7 is a perspective view showing a tube tip sealing plate of a worm culture and observation apparatus according to an embodiment of the invention.

The support structure 10 of the worm culture and observation apparatus 1 according to an embodiment of the invention may further comprise a tube tip sealing plate 9 that is movably mounted on the support structure and that may be positioned with an actuation mechanism or alternatively may be provided as a plate that is manually insertable, below the tips 26b of the hollow tubes 26. The tube tip sealing plate 9 comprises a support frame 11 and one or more elastomer pads 13 against which the tips 26b of the hollow tubes 26 may be pressed. The tube tip sealing plate 9 is used during a priming operation of the worm culture and observation apparatus 1 to seal the tips 26b of the rigid tubes 26 in order to apply pressure within the microfluidic channels 54. The pressure within the microfluidic chip channels and within the fluidic tubes 36 may in particular be advantageously used during a debubbling operation. The tube tip sealing plate 9 may also be employed during other steps requiring a certain overpressure to be created in the microfluidic channels.

In an embodiment (not shown), the tube tip sealing plate 9 may be fixed to the reservoirs support platform 7 and movable by the movable table 12 into the sealing position below the tips 26b.

Figure 1:
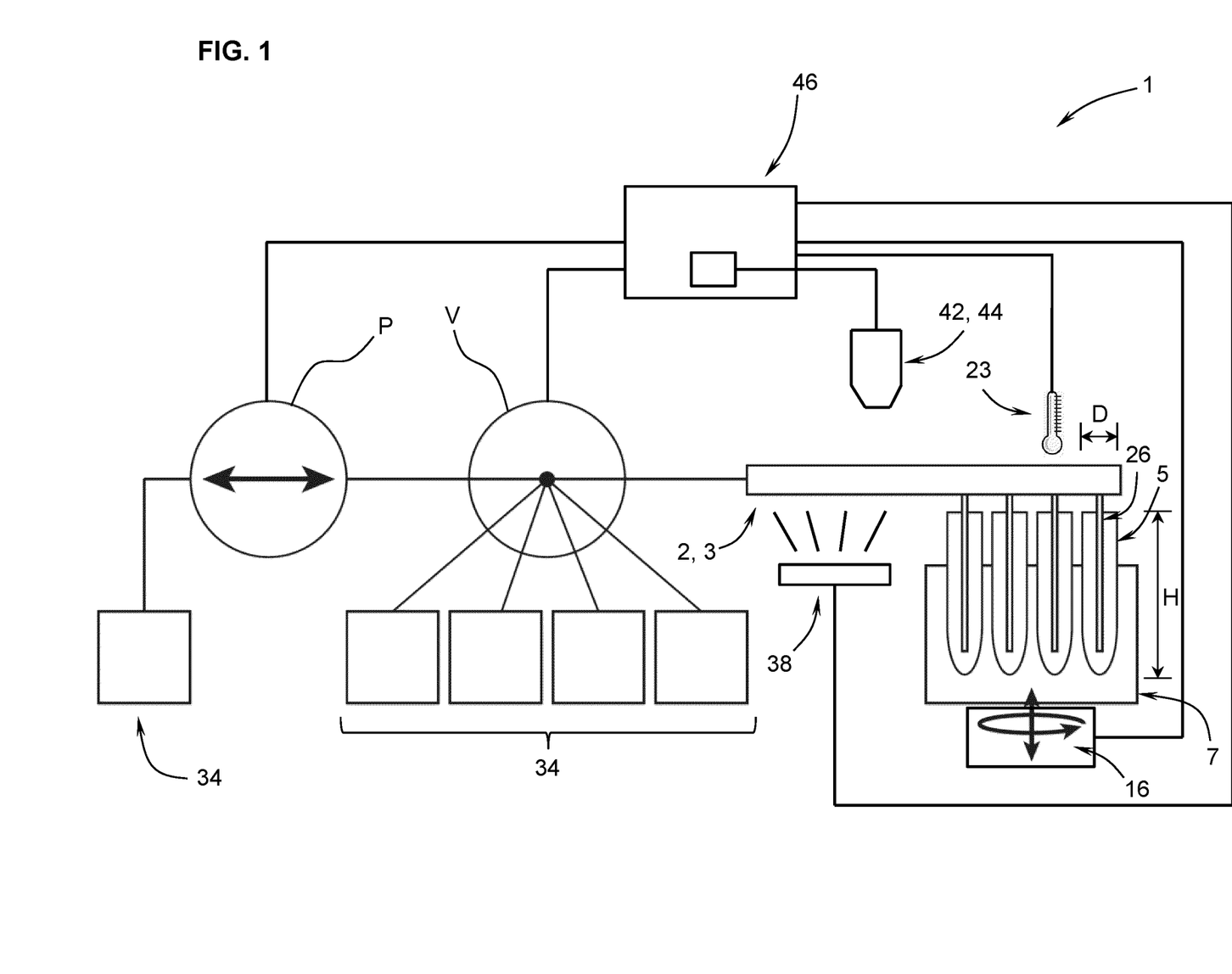
FIG. 1 is a schematic representation of a worm culture and observation apparatus according to an embodiment of the invention.
Figure 2:
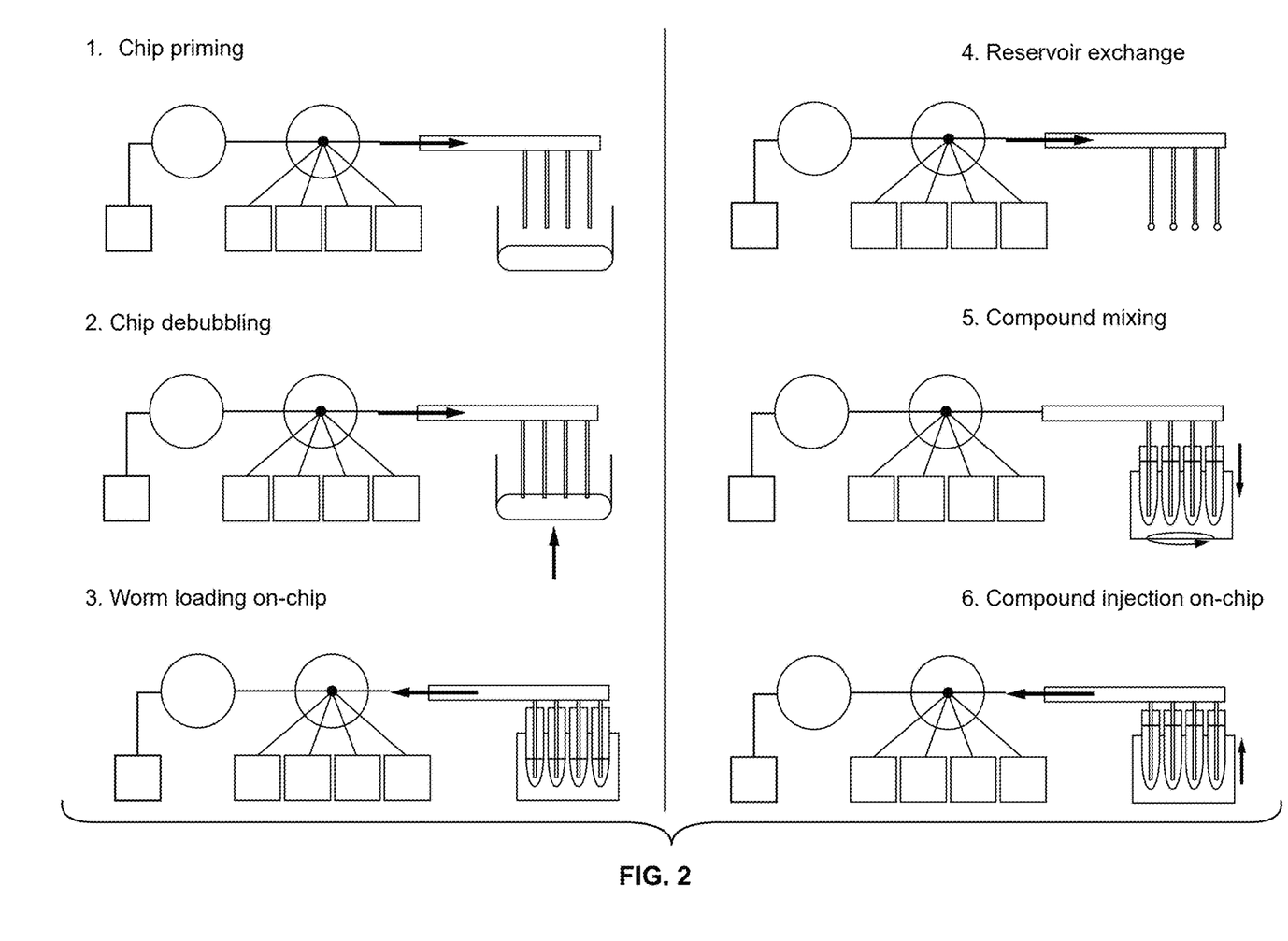
FIG. 2 is a schematic illustration of steps in priming and operating a worm culture and observation apparatus according to an embodiment of the invention.
Figure 3:
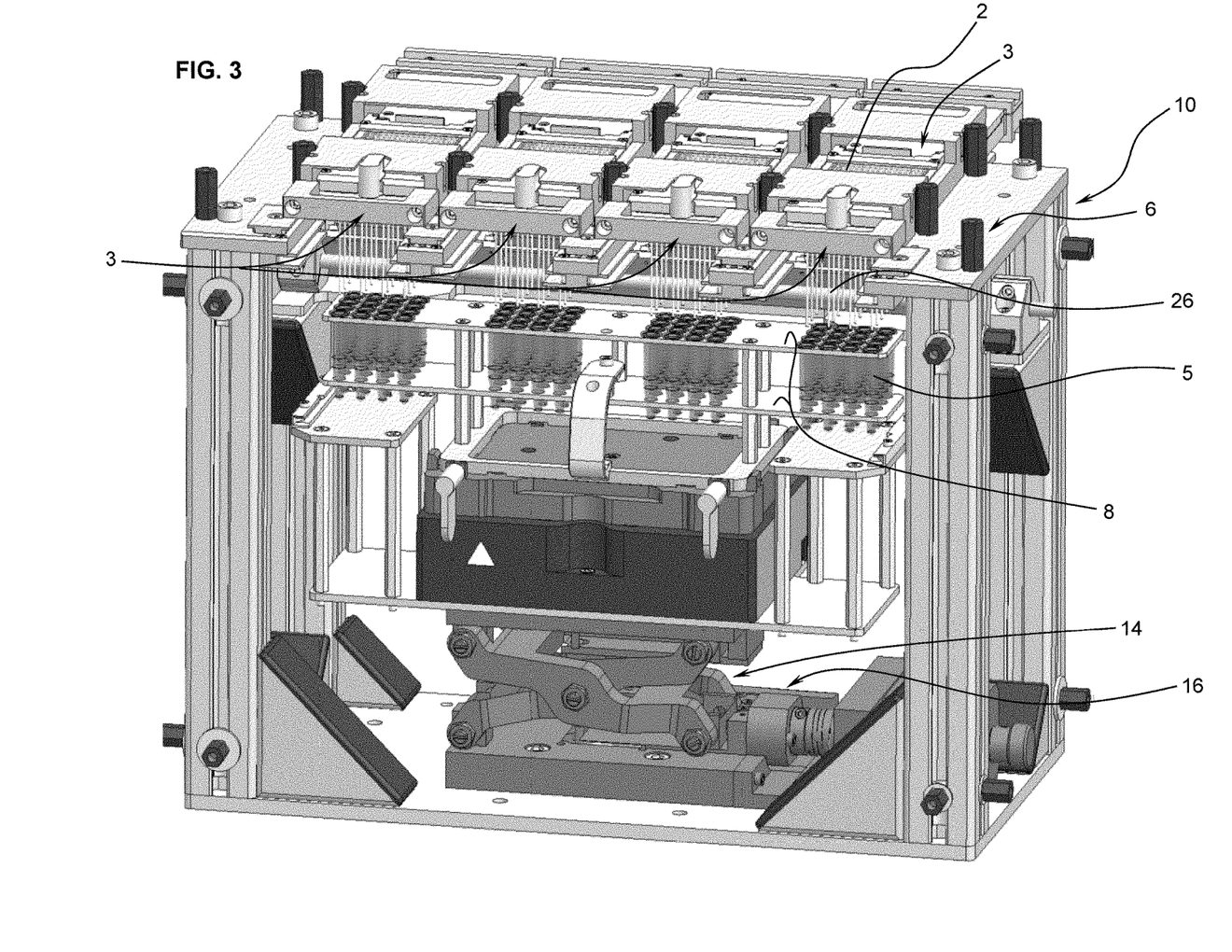
FIG. 3 is a perspective view, with a housing removed, of a worm culture and observation apparatus according to an embodiment of the invention (without showing a microscope or computing system)
Figure 3A:
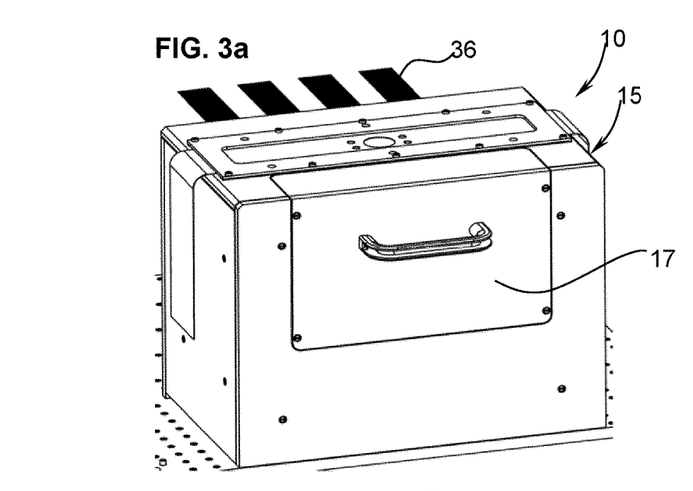
FIGS. 3a-3c are perspective views of a worm culture and observation apparatus according to an embodiment of the invention.
Figure 3B:
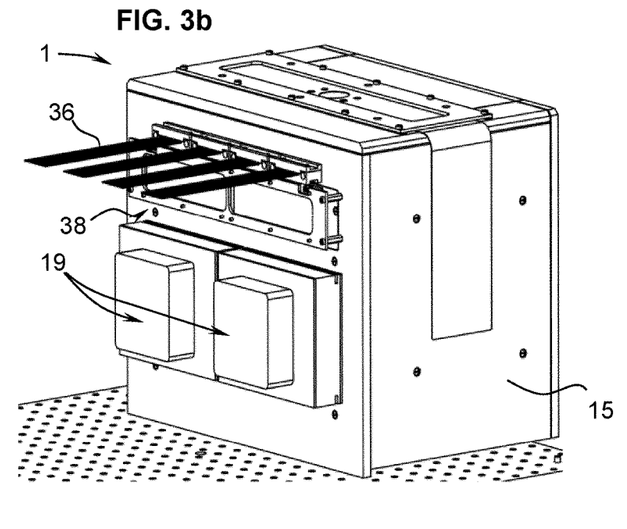
Figure 3C:
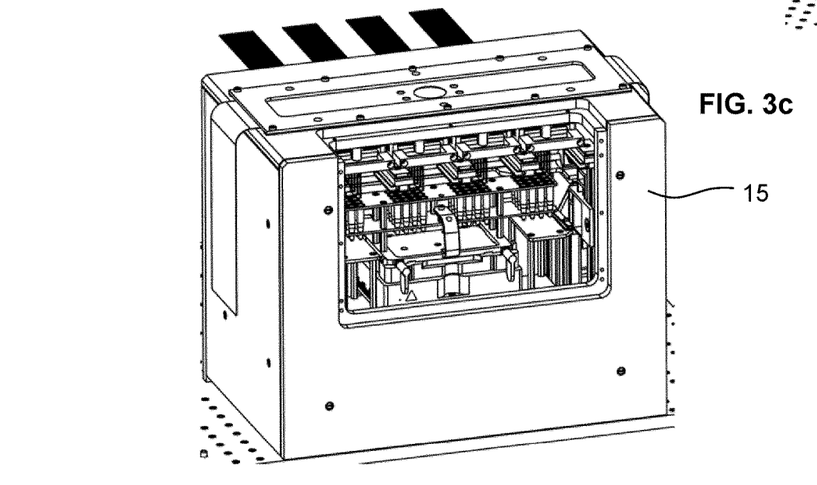

Referring to FIG. 2, an example of an operating procedure of the worm culture and observation apparatus 1 according to an embodiment of the invention will be described.

In an initial step, the one or more microfluidic chips are mounted in the corresponding chip holders 3 fluidically coupled to corresponding fluidic tubes connectors 4. The pump P is operated to draw liquid from a reagent's container 34, constituting in particular a priming liquid such as an aqueous solution such as DI water, ethanol 70% or directly S-medium (a per se typical medium used for worm liquid culture and maintenance) for filling the fluidic tube 36, microfluidics channels 54, and hollow tubes 26 with the priming liquid, thus removing the air out of the fluidic channel system.

Once the pump P has injected liquid all the way through to the tips 26b and a certain amount of liquid has flowed out of all of the tips 26b of the one more microfluidic chips, the tube tip sealing plate 9 may be pressed against the tips 26b to seal the tips. The pump P may be operated to create an overpressure within the fluidic channels in a debubbling operation. Optionally, the debubbling operation may comprise a first compression stage, followed by release of the tube tip sealing plate from the tips 26b and operation of the pump to inject further priming fluid out through the tube tips 26b. A resealing of the tips, pumping to create an overpressure in the microfluidic channels, and subsequent release may be operated a further one or more times. This procedure effectively allows any bubbles within the microfluidic channels to be removed.

Thereafter, worms may be loaded into the culture chambers 52 of the microfluidic chips 2. This may be performed for instance by placing worms in an early stage of development, at a size sufficiently small to be pumped into the microfluidic chambers 52, in liquid in the nutrient reservoirs 5 that are positioned under the hollow tubes, immersing the hollow tubes within the nutrient reservoirs and operating the pump in the opposite direction to the priming direction. The valve system V may be actuated to direct the pump liquid into a waste container, considering that some of the worms will be pumped through all of the culture chambers 52 and into the fluidic tubes 36.

The nutrient reservoirs 5 may then be removed once the worms have been loaded in the microfluidic chip and a slight forward pumping effected to ensure that droplets are formed at the tips 26b of the hollow tubes 26. This ensures that the tubes are filled completely with liquid, that there is no air inside, when subsequently inserting the tips into nutrient reservoirs 5 containing nutrients and the substances to be tested. These substances may then be drawn into the microfluidic channels and chambers 54, 52 of the microfluidic chips 2 by operation of the pump in the reverse direction to the priming direction.

It may be noted that during the worm loading on chip operation, the pump may be operated in a pulsed manner in order to force the worms past filters between microfluidic chambers 52, these filters being at a size configured to prevent the worms from swimming or flowing out of the chambers under conditions of a lower pressure fluid flow. Thus, once loaded in the microfluidic chambers 52, the nutrients and substances to be tested may flow through the microfluidic chambers with a low pressure, low flow rate conditions in which the microfluidic worms remain within the microfluidic chambers and are supplied with nutrients and the substances to be tested in a process that may last typically a few days to a few weeks. Some tests may however only last a few hours or even just minutes (e.g. acute toxicity). The temperature and possibly other environmental conditions may advantageously be controlled within the enclosure chamber to promote optimal growth of the worms for the testing period with limited manual intervention. Also, if required, temperature cycles may be automatically performed to test temperature related factors on the microscopic worm if required by the testing protocol.

During that time, the microscope 44 may be positioned sequentially over various microfluidic chips 2 for capturing still or moving images, and there may also be a plurality of microscopes provided on the system for capturing images of the microfluidic chambers and worms therein simultaneously.

LIST OF FEATURE REFERENCES

| Microscopic culture and observation apparatus 1 |
| --- |
| Support structure 10 |
| Enclosure 15 |
| Cover 17 |
| Temperature control (heating/cooling) unit 19 |
| Temperature sensor 23 |
| Microfluidic cartridge support platform 6 |
| Reservoirs support platform 7 |
| Movable table 12 |
| Height actuator mechanism 14 |
| Actuator 16 |
| Reservoir support plate 8 |
| Tube tip sealing plate 9 |
| Support frame 11 |
| Elastomer pad 13 |
| Chip holder 3 |
| Base 18 |
| Pump side fluidic coupling 24 |
| Chip coupling section 24a |
| Connector coupling section 24b |
| Reservoir side fluidic coupling 26 |
| Hollow tube (e.g. needle) |
| Chip coupling section 26a |
| Tip 26b |
| Chip support section 18a |
| Connector support section 18b |
| Cover 20 |
| Viewing window 21 |
| Closing mechanism/clamp/latch 22 |
| Fluidic tubes connector 4 |
| Top part 28a |
| Bottom part 28b |
| Grooves 30 |
| Plug coupling portion 32 |
| Nutrition reservoirs 5 |
| Pump P |
| Reagent & waste containers 34 |
| Valve system V |
| Fluidic tubes 36 |
| Lighting system 38 |
| Light source |
| LED panel 39 |
| Mirror 40 |
| Imaging system 42 |
| Microscope 44 |
| Computing system 46 |
| Microfluidic chip 2 |
| Base 50a |
| Culture chambers 52 |
| Microfluidic channels 54 |
| Pump side coupling 54a |
| Reservoir side coupling 54b |
| Cover 50b |
| Reservoir tube diameter D |
| Reservoir tube height H |

The invention claimed is:

1. A microscopic worm culture and observation apparatus, comprising a support structure, one or more chip holders mounted on the support structure, a pump and a valve system, each chip holder configured for holding a microfluidic chip having one or more microfluidic channels and culture chambers therein extending between a pump side coupling of the microfluidic chip and a reservoir side coupling of the microfluidic chip, the support structure comprising a reservoirs support platform and a movable table, the reservoirs support platform being mounted on the movable table, the reservoirs support platform configured for holding a plurality of nutrition reservoirs for containing microscopic worms or nutrients and substances to be tested in a liquid, the chip holder and/or microfluidic chips comprising reservoir side fluidic couplings in the form of hollow tubes extending from the microfluidic chip to a tip at a free end of the hollow tube, each tip insertable in a corresponding nutrition reservoir, wherein the support structure comprises an enclosure forming a chamber within which the one or more chip holders and the reservoirs support platform is housed, and a temperature control unit and a temperature sensor for control of the temperature within the chamber, the enclosure comprising an openable or removable cover allowing access to the inside of the enclosure, and wherein the movable table is coupled to an oscillator mechanism configured to impart an oscillation movement to the reservoir support platform in a horizontal plane by an amplitude less than a diameter of the nutrient reservoir.

2. The apparatus according to claim 1, wherein the movable table is coupled to a height actuator mechanism to actuate a vertical movement of the reservoirs support platform with the height actuator mechanism.

3. The apparatus according to claim 1, wherein there are a plurality of said chip holders arranged in parallel on the support structure.

4. The apparatus according to claim 1, in conjunction with said microfluidic chips wherein each microfluidic chip comprises a plurality of parallel microfluidic channels, each microfluidic channel passing fluidically through a plurality of successive culture chambers.

5. The apparatus according to claim 4, wherein each microfluidic channel comprises a pump side coupling orifice and a reservoir side coupling orifice, the orifices configured for insertably receiving in a sealing manner ends of hollow tubes.

6. The apparatus according to claim 1, wherein the microfluidic chips are fluidically coupled to corresponding fluidic tubes connectors pluggably coupled to the chip holder and sealingly lodging ends of fluidic tubes that extends to the pump and/or valve system.

7. The apparatus according to claim 1, further comprising a tube tip sealing plate comprising a support frame and an elastomer pad movable under the tips of the hollow tubes and configured for sealingly pressing said elastomer pads against said tips during a corresponding operation step of the apparatus.

8. The apparatus according to claim 7, wherein said corresponding operation step comprises a debubbling operation of the fluidic channels within the microfluidic chip.

9. The apparatus according to claim 1, wherein reservoir side coupling orifices of the microfluidic chip and corresponding hollow tubes are arranged in a spaced out manner in both X and Y orthogonal directions of a horizontal plane, such that the hollow tubes are spaced out according to a two-dimensional grid, the hollow tubes being arranged at intersections of a square or rectangular grid.

10. The apparatus according to claim 1, wherein the chip holder and/or microfluidic chips comprises pump side fluidic couplings, the pump side fluidic couplings comprising a plurality of hollow tubes coupled to the chip holder and inserted into corresponding pump side coupling orifices of the microfluidic chip.

11. The apparatus according to claim 1, wherein the chip holder comprises a base and a cover pivotally coupled to the base, movable from an open position in which the microfluidic chip may be lodged on the base, and movable to a closed position held by a closing mechanism clamping the microfluidic chip within the chip holder.

12. The apparatus according to claim 1, wherein the chip holder comprises a viewing window in both a base and cover to allow light to shine through from a bottom of the microfluidic chip to a top side viewable by a microscope.

13. The apparatus according to claim 1, further comprising:
- an imaging system comprising a microscope,
- a lighting system, and
- a computing system connected to the valve system and pump.

* * * * *